May 1, 1945.   E. T. PLATZ   2,374,778
SWITCH
Filed June 18, 1942   3 Sheets-Sheet 1

INVENTOR
ELWOOD T. PLATZ

BY
Daniel G Cullen
ATTORNEY

May 1, 1945.　　　　E. T. PLATZ　　　　2,374,778
SWITCH
Filed June 18, 1942　　　　3 Sheets-Sheet 2

INVENTOR
ELWOOD T. PLATZ
BY
Daniel G Cullen
ATTORNEY

May 1, 1945.　　　　　E. T. PLATZ　　　　　2,374,778
SWITCH
Filed June 18, 1942　　　　　3 Sheets-Sheet 3
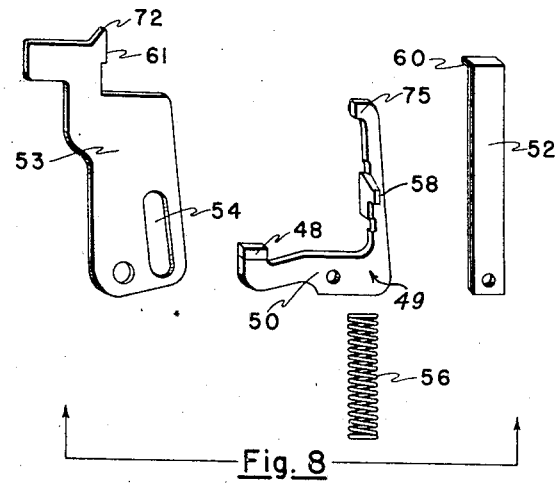
Fig. 8
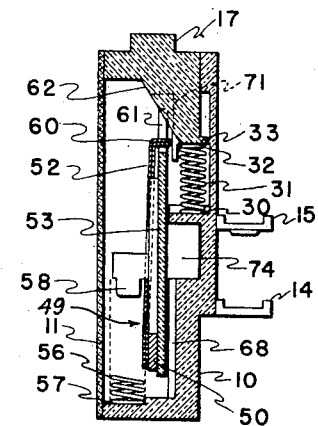
Fig. 9
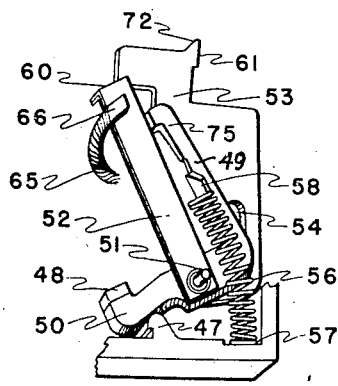
Fig. 10
Fig. 14
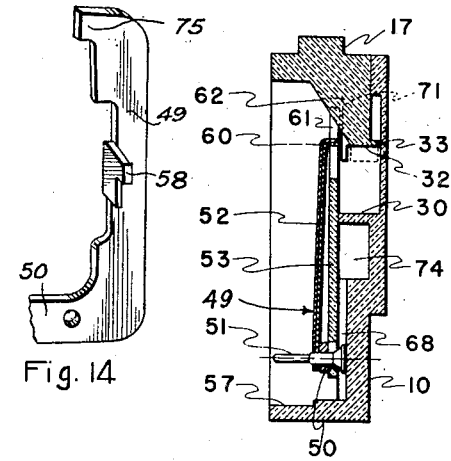
Fig. 11
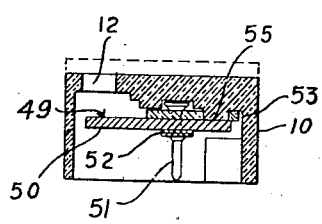
Fig. 13
INVENTOR
ELWOOD T. PLATZ
BY
Daniel G. Cullen
ATTORNEY Patented May 1, 1945

2,374,778

UNITED STATES PATENT OFFICE 2,374,778

SWITCH

Elwood T. Platz, Detroit, Mich., assignor to Bulldog Electric Products Company, Detroit, Mich., a corporation of West Virginia Application July 18, 1942, Serial No. 451,431

6 Claims. (Cl. 200—116)

This application relates to switches, and discloses a switch wherein manual operation is provided by an exposed handle.

The construction shown in this application permits the use of a handle arranged to be movable in but one manner for controlling the movable contact.

Since the handle need have but one manner of movement, it is, as shown here, formed as a push button, to be pushed in manually from a rest-out position and then released to be pushed out from the casing to that rest-out position by a handle biasing spring.

During its cycle of travel, it controls or causes the switch to open, if it is closed, or to close, if it is open.

The button is the preferred form of handle. Other forms may be suggested. However, we start out with a desire to have a handle such that it has but one manner of movement for all manual operations, latch releasing for contact opening and latch relatching for contact closing. Having accomplished that desire we prefer to use a button, manifestly the simplest and best of all handle forms.

In the switch here shown, a latch is used to control the operation of the operating spring upon the movable contactor of the switch. The button directly controls relatching and contact closing, through a translator. It also directly controls latch tripping for contact opening. If, as is shown, the switch is of the automatic circuit opening type, as well as of the manual circuit opening type, a second latch tripping means is employed, this one being automatically operable and circuit condition responsive, operating independently of the button.

Since all movements of the button are identical, and since the button is intended, not only to control the opening of the circuit, but also to control the closing of the circuit, a translator is employed for translating successive identical button movements into successive different movable contact movements, depending on the position of the movable contact at the start of button movement. The translator position is determined by the position of the movable contact. If the circuit is open, the translator is in position to be engaged by the button and translate the next button movement into circuit closing movement of the contact. If the circuit is closed, the translator is out of position to be engaged by the button, but when the circuit is opened, the translator is moved to button engaging position for circuit closing on the next button movement.

The switch above described is shown in the appended drawings.

In these drawings,

Fig. 8 shows parts in detail.

Fig. 9 is a section view.

Fig. 10 shows parts in "off" position.

Figs. 11 and 12 show the manual latch releasing action.

Fig. 13 is a transverse section view.

Fig. 14 shows part of the contactor per se.

Figs. 9, 11, 13 are sections on lines 9—9, 11—11, 13—13 of Fig. 3, but with part omitted for sake of clarity.

Figure 1:
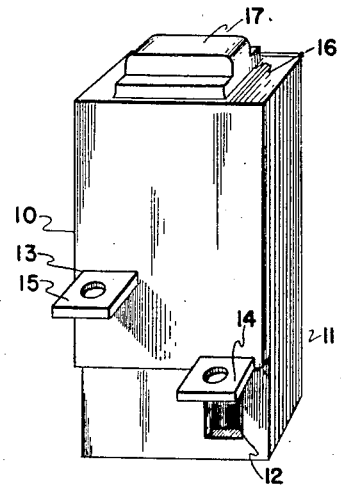
Fig. 1 is an outside view.

The drawings show the switch as comprising a cup shaped casing 10 having an open front closed by a plate or cover 11 secured thereto, as by screws not shown. The back of the case is formed with two openings, 12 and 13, for line and load terminals 14—15.

In an opening 16 reciprocates a handle or actuator 17 formed as a push button to be engaged by the finger of the operator for manipulation by downward pressure only. A groove 18 of the handle receives a tongue 19 of the casing, with operating clearances provided between the side walls 20—21 of the handle and the left and right side surfaces 22 and 23 of the casing interior; the back and front surfaces 24—25 of the handle slidably engage the back surface 26 of the casing and the surface of the cover.

The only force required for all manual actions of the parts is a push and the push provided by a finger on the bottom or handle 17 is adequate for all requirements. A finger push will change the position of the handle and the condition of the parts and that is the only force required. There is no push-pull action but instead the action is simply push-push.

A cross ledge 29 of the casing has at 30, a seat for a coiled compression spring 31 which biases the handle outwardly, the upper end of the spring seating in a socket 32 of the handle back, and against a lug 33 thereof, which lug is adapted to cooperate with the upper end 34 of a spring receiving socket 35 in the back of the casing to limit outward motion of the handle; another limitation or stop for handle movement is provided by a handle lug 36 formed to cooperate with a casing lug 37.

Contactor—Latch

The circuit controlling parts of the switch include a stationary contact 44 disposed under and against a ledge 45 of the casing and formed integral with line terminal 14. A U shaped fibre arc shield 46 engages a hooked stop lug 47 of the casing. Adapted to make butt contact with the stationary contact 44 is the contact portion 48 of a movable contactor 49 having an L shaped contact arm 50 which is riveted and welded at 51 to a bimetal strip 52, with rivet 51 being formed as a pin to provide a loose pivotal connection between the contactor 49, comprising parts 50—52, and a plate 53 of insulation, the latter having an elongated slot 54 receiving a stop lug 55 formed on the back of the casing.

An operating spring 56 has its lower end 57 in a seat of the casing and its upper end surrounding a spring lug 58 formed from the contact arm 50. Spring 56 functions to rotate arm 50 counter-clockwise for circuit opening on the axis of pivot pin 51 when the latching hook 60 forming the free end of the bimetal strip 52 is released from engagement with the holding abutment, i. e., the latching edge 61 of the plate 53. Such release of latch 60 from the holding means 61 is effected either automatically, by the warping of the bimetal 52 on overload, or manually, by the camming action provided by a sloping cam 62 of and integral with the handle. When this cam is pushed down it cams latch hook 60 off the abutment or holding means 61, to permit the contact arm to be rocked counter-clockwise relative to the plate 53 by the spring 56, for circuit opening.

Spring 56 also biases contactor 50 and plate 53 upwardly, and when the latch holds, provides the force to move contact 48 towards and press contact 48 against contact 44.

Figure 2:
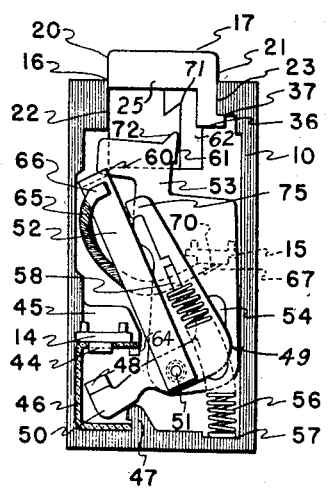
Figs. 2 and 3 show "off" and "on" positions, respectively.
Figure 3:
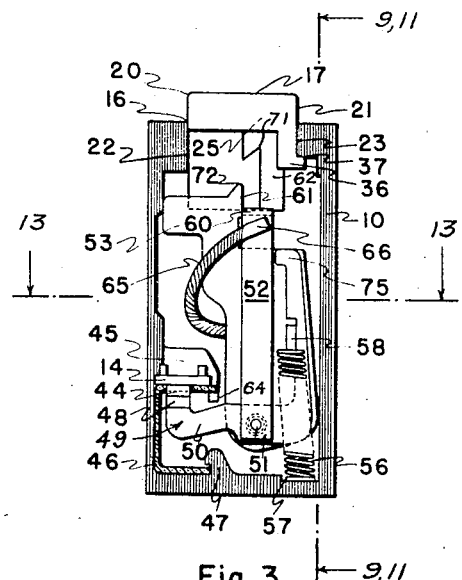

In a circuit opening action (Figs. 2–3), spring 56, through pivot axis 51, will slide the plate 53 upwardly, with the latter guided by the casing; the engagement of the lower edge of plate slot 54 with casing stop 55 will limit such movement of the plate. That stop 55 will at that time function as a pivot for the plate 53 and since the line of action of spring 56, through axis 51, is to the left of that pivot, plate 53 will rock clockwise about stop 55, under the spring biasing force (Fig. 2).

Automatic opening action (release of latch 60 off holding means 61, effected by warping of strip 52 on overload, and subsequent rocking of contactor 49 counter-clockwise by spring 56 and rocking of plate 53 clockwise, also by spring 56) is free of the handle; no manipulation or holding of the handle can impair the tripping or releasing of the latch and the subsequent movements of the contactor or plate for circuit opening.

Stop 64 on the end of the arc shield 46 is engaged by the contactor at the very start of the movement of the contactor and plate 53 on latch release; stop 64 starts contact separation before plate 53 reaches the upper limit of its travel (stop 55) by providing a pivot nearer the contact points 44—48 than is the pivot pin 51 and thus pries the contacts apart with greater force from spring 56 for contact separation than if pivot 51 were the only pivot for contact separation; stop 64 also causes an earlier contact break—as well as providing a greater moment arm for contact break.

Stop 64 is clear of the contactor when the circuit is closed.

A flexible connector 65, looped around the bimetal strip 52, has one end 66 secured to the free end of that bimetal strip and has its other end 67 secured to that part of the load terminal 15 that was thrust into the casing through the load terminal hole 13. This connector completes the circuit between the two terminals 14—15, employing only that part of the contact arm 50 extending from contact 48 to pivot pin 51 for carrying current.

Figure 12:
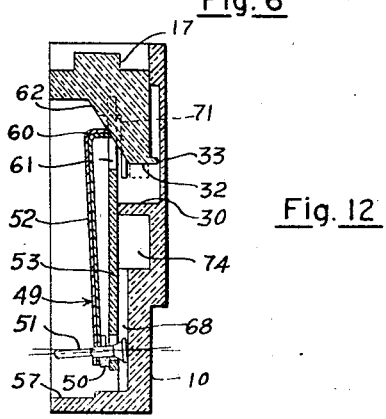

The end of pivot pin 51 near the back of the casing is seated within a casing pocket 68, elongated to permit the pin 51 to slide up and down. The other end of the pin, near the metal cover 11, is not pocketed. This fact, coupled with the fact that the resistance against bending offered by the bimetal is considerable, reduces to a minimum the deflection of the bimetal strip under the influence of the cam 62. When the handle is moved down so that cam 62 pushes the latch 60 off the holding means 61, the contactor, i. e., the entire contact arm assembly 50—51—52, swings forward and down (Figs. 11–12), with the forward end of pin 51 dropping below the rear end of that pin 51; the forward swing of the contactor permits the latch 60 to leave the holding means 61.

There is considerable play permitted between the pin 51 and the hole in plate 53 through which that pin passes, thus permitting rocking of the contactor out of the plane which is parallel to the plate 53 when the latch is caused to release by the handle cam 62.

A lug 70 bent down from terminal 15, is the part to which the end 67 of connector 65 is secured.

It has been described that the unlatching movement of the latch 60 forwardly off the holding means or edge 61 permits spring 56 to rock the contactor 50—52 counter-clockwise to open the circuit. This movement terminates with the latch 60 remote from and to the left of holding edge 61, but resting on the surface of plate 53. Plate 53 will have been rocked clockwise. Handle 17 will, when released, assume its full out position. (Fig. 2.)

Figure 4:
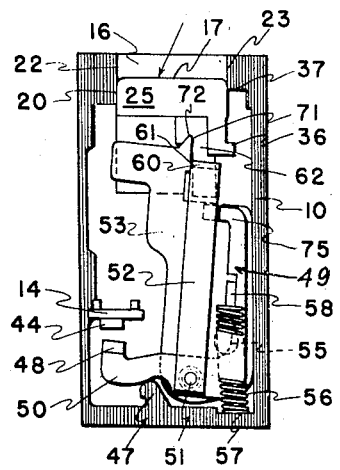
Fig. 4 shows the parts at the end of an inward stroke of the handle, after the parts were in the "off" position.
Figure 5:
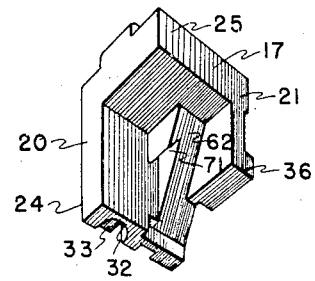
Figs. 5 and 6 show the handle.
Figure 6:
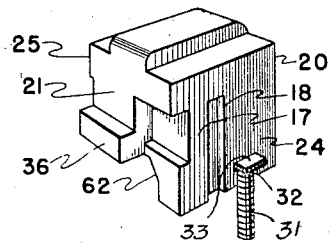
Figure 7:
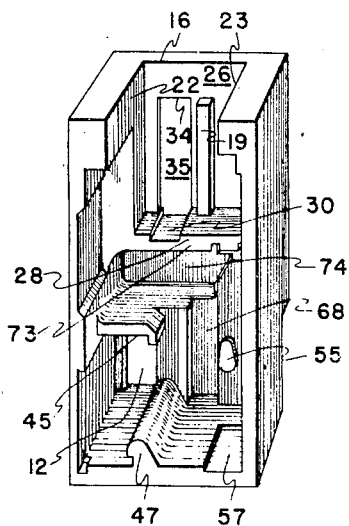
Fig. 7 shows the casing.

To restore the parts to the circuit closing position (Fig. 3), the handle 17 is pushed down as far as it will go and it will go down far enough, first to cause the cam notch 71 thereof to engage a resetting lug 72 of the plate 53, and second, to cause the pin 51 to slide downwardly. That part of plate 53 connecting lug 72 and pin 51 acts as a translator. The contactor 49 will move downwardly with pin 51 until arm 50 reaches a resetting stop 47 of the casing, although in many instances that stop will have been engaged by the arm 50 at the end of the circuit opening movement of the arm. Continued downward movement of the handle and continued downward movement of the lug 72, and pin 51, will cause the contactor to engage stop 47 and rock clockwise, on axis 51, far enough to cause latch 60 to slide over or overtravel beyond holding edge 61 (Fig. 4), for relatching. The release of the handle by the operator at that time will free the handle to be moved to its outward position by the spring 31, and as the handle moves outwardly, the spring 56 will act on the contactor. The contactor will rock slightly counter-clockwise and assume its final "on" position, with latch 60 engaging holding edge 61, and with contact 48 abutting contact 44 under pressure of spring 56.

Plate 53 will rock counter-clockwise to place lug 72 out of the path of cam 71.

There is but one terminated or rest or final open circuit position for the various parts. Consequently, there is but one movement of the handle required for restoring the parts to circuit closing position, regardless of the cause of circuit opening. That movement of the handle, down or inwardly, and then up or outwardly when released, recloses the circuit.

Normally the handle moves outwardly or upwardly when released. If, however, by some outside agency, the handle is restrained from so moving, its failure so to move will not in any way impede the circuit opening movement of the contactor 49 or plate 53 because these parts are moved by the spring 56 and there is no formation on the handle that can restrain the desired opening movement of these parts. If and when the agency which restrains the outward movement of the handle that normally takes place, is later removed, then the handle will at that time be moved outwardly by the spring 31.

While the plate 53 is shown as of one piece, whereby the translator part, connecting lug 72 and pin 51, and the holding edge 61, are integral, it is not necessary that these parts be integral, inasmuch as they may function separately. Similarly handle parts 62 and 71, functioning separately, may be separate, but it is preferred that they be integral.

It will also be observed that the space 74 between ledge 20 and the line terminal ledge 45 provides a pocket for the flexible connector 65, which, thus being pocketed, is restrained from fouling the moving parts of the device to impede their operation.

The handle is operated by a rectilinear in and out movement. In each movement, the handle is pushed inwardly by the operator's finger and then released so as to be pushed outwardly by the spring 31. When the handle is pushed inwardly, with the circuit closed, the latch is released and the contactor swings counter-clockwise; and when the handle is released then from its inward position, the resetting lug 72 rocks clockwise into the path of the handle resetting cam 71 and the handle is moved to the full outward position by spring 31. On the next manual actuation of the handle, starting with the handle in the full out position, and the latch released, the handle moves the plate down to rock the contactor slightly beyond the latching position; the release of the handle at that time by the operator frees the handle so it can be moved out by its spring 31, and at the same time frees the contactor so that spring 56 can move the contactor latch 60 against the holding edge 61 and move lug 72 out of the path of cam 71 and move the contactor upwardly until the contactor part 48 engages and is stopped by contact 44 for contact pressure.

That part of plate 53 which connects and includes the resetting lug 72 and the hole for pivot pin 51, may be considered as a translator; and the holding surface 61 of plate 53 may be considered as separate and independent from the translator, though, of course, they are all integral.

It will be observed that when the latch is released, whether that is caused automatically or manually, the translator moves into position to be engaged by handle cam 71 on the next handle advance for translating that handle advance into a downward push on the contactor for resetting its latch to the holding means. Inasmuch as the handle movement for circuit opening is identical with its movement for circuit closing, it is required that the translator be in the handle path, i. e., the path of handle cam 71, only when the circuit is open, and that it be out of the path of cam 71 when the circuit is closed, and that it be constructed to provide an operative connection, when the circuit is open, between the handle cam 71 and the latch to translate handle advance (cam 71), into resetting of the latch. Therefore, the movement of the contactor or latch is relied upon to determine the position of the translator. When the latch holds, the translator (lug 72) is out of the path of advance of the handle (cam 71) and when the latch releases, the translator (lug 72) moves into the path of the handle cam 71 and when the latch relatches, the translator lug 72 moves out of the path of handle cam 71.

*Calibration*

The engagement of contactor end 75 and plate 53 is useful for calibrating the overlapping of latch 60 and latch edge 61; if the position of latch 61 is accurately determined with respect to contactor end 75, the position of end 75 with respect to the surface of the plate 53 will determine the overlap of latch 60 and edge 61.

In addition to its circuit opening and contact pressure and latch maintaining functions, spring 56 functions to assist in calibration. The lower end of spring 56 is forward of its upper end; consequently spring 56 urges the contactor end 75 constantly against the surface of the plate 53 to gauge and help maintain consistent calibration.

Relatching occurs with the contacts separated, and handle release after relatching is a condition precedent to contact closing, and unlatching can not be restrained by the handle; therefore, the contactor may trip free of the handle at all times.

Since all contact movements are caused and controlled directly by the spring, which operates with a quick or snap action, the speed of contact making and breaking is not determined by the speed of the handle, but rather by the quick or speedy action of the spring 56.

I claim:

1. A switch having a movable contactor, a manually releasable latch therefor, a spring for moving said contactor out of circuit closing position when the latch releases, and for returning it to circuit closing position when the latch is reset, a single means successively manually operable in identical manner for unlatching the latch if it is latched, and for relatching the latch if it has been unlatched, means establishing an unlatching connection between the latch and the manual means, and a movable translator for establishing an operative relatching connection between the manual means and the latch, only when the latch is unlatched, the translator position being determined by the latch position.

2. In a switch, a contactor, manually releasable latch means therefor, spring means for moving the contactor from circuit closing position when it is unlatched, and a manually accessible and manually actuated means having a portion for releasing the latch means, and a translator for operatively connecting the latch means and the manual means but only when the latch means is unlatched, for enabling the manual means to relatch the latch means, the latch means and translator being interconnected so that unlatching positions the translator into a manual means engaging path, and relatching moves it out of that path.

3. A switch having a movable contactor, a manually releasable latch therefor, a spring arranged to move said contactor out of circuit closing position when the latch releases, and to return it to circuit closing position when the latch is reset, and a single push button arranged to be pushed in to release the latch, if it holds, and to be pushed in to reset the latch, if it is released, means establishing a latch releasing connection between the push button and the latch, and a movable translator for establishing an operative resetting connection between the push button and the latch, only when the latch is released, the translator position being determined by the latch position.

4. In a switch, a manual means constructed and guided to have successive identical movements, manually releasable latch means, a cam forming an operative unlatching connection between the manual means and the latch means, and a translator for forming an operative relatching connection between the manual means and the latch means, the parts being so constructed that the translator is in a position to connect the manual means and latch means operatively, but only when the latch means is unlatched, being out of that position when the latch means is latched, the latch means and translator being so operatively connected that when the latch means is unlatched it moves the translator into manual means engaging position, and when the latch means is moved to latch, it moves the translator out of manual means engaging position, and when the translator is in manual means engaging position and is moved by the manual means, it translates manual means movement into relatching movement of the latch means.

5. In a switch, a stationary contact, a movable contactor, manually releasable latch means for the contactor, spring means operating on the contactor for biasing it towards and against the contact, when it is latched, and for moving it from the contact, when it is unlatched, a single manually manipulable means successively operable for relatching the contactor so that the contactor may thereupon be moved to and against the contact, and for unlatching the latch means so that the spring means may thereupon move the contactor from the contact, a cam forming an unlatching connection between the latch means and the manual means, and a translator forming a relatching connection between the manual means and the latch means, but only when the latch means is unlatched, being movable in response to latch movement whereby unlatching movement positions the translator into operative connection position for relatching, and relatching movement positions the translator out of operative connection position for relatching.

6. In a switch, a stationary contact, a movably mounted translator, a movably mounted contactor, latch means on the contactor interlatching it to the translator, spring means for moving the contactor towards and for urging it against the stationary contact when the latch holds, and for moving the contactor from the stationary contact when the latch releases, a push button having an unlatching portion for acting directly on the latch for unlatching the contactor from the translator, and a relatching portion for acting directly on the translator to move it and thus move the contactor and latch for relatching the contactor to the translator, the push button being arranged to operate for unlatching or relatching only when it is pushed in, and not when it is released to return, means for returning the push button when it is released, the contactor spring means being arranged to operate on the translator to move it into the path of the push button relatching portion when the latch releases, whereby the translator forms an operative connection between the push button relatching portion and the contactor only when the latch has released, and also to move the latch out of the path of the push button unlatching portion, with push button relatching movement operating not only to move the translator and the contactor for relatching them relatively, but also to move the translator out of the path of the push button relatching portion, and to move the contactor latch into the path of the push button unlatching portion.

ELWOOD T. PLATZ.